United States Patent [19]

Medlin

[11] Patent Number: 4,907,204

[45] Date of Patent: Mar. 6, 1990

[54] METHOD FOR IDENTIFYING FORMATION FRACTURES SURROUNDING A WELL CASING

[75] Inventor: William L. Medlin, Dallas, Tex.

[73] Assignee: Mobil Oil Corporation, New York, N.Y.

[21] Appl. No.: 331,153

[22] Filed: Mar. 31, 1989

[51] Int. Cl.$^4$ ............................................. G01V 1/40
[52] U.S. Cl. ..................................... 367/35; 181/105; 367/31
[58] Field of Search ..................... 367/31, 35; 181/105

[56] References Cited

U.S. PATENT DOCUMENTS

| | | | |
|---|---|---|---|
| Re. 24,446 | 3/1958 | Summers | 181/0.5 |
| 3,333,238 | 7/1967 | Caldwell | 340/18 |
| 3,356,177 | 12/1967 | Loren | 181/0.5 |
| 3,362,011 | 1/1968 | Zemanek, Jr. | 340/18 |
| 4,383,308 | 5/1983 | Caldwell | 367/31 |
| 4,432,077 | 2/1984 | Alhilali et al. | 367/31 |
| 4,575,828 | 3/1986 | Williams | 367/31 |
| 4,649,525 | 3/1987 | Angona et al. | 367/31 |
| 4,674,067 | 6/1987 | Zemanek, Jr. | 367/25 |
| 4,683,557 | 7/1987 | Willis | 367/57 |
| 4,715,019 | 12/1987 | Medlin et al. | 367/31 |
| 4,718,046 | 1/1988 | Medlin | 367/31 |
| 4,799,200 | 1/1989 | Cheung | 367/35 |

FOREIGN PATENT DOCUMENTS 0127548  5/1984  European Pat. Off. .............. 367/35

OTHER PUBLICATIONS

"The Correlation of Tube Wave Events with Open Fractures in Fluid-Filled Boreholes", C. F. Huang and J. A. Hunter, Current Research, Part A, Geological Survey of Canada, Paper 81-1A, pp. 361-376, 1981.

*Primary Examiner*—Thomas H. Tarcza
*Assistant Examiner*—Ian J. Lobo
*Attorney, Agent, or Firm*—Alexander J. McKillop; Charles J. Speciale; George W. Hager, Jr.

[57] ABSTRACT

An acoustic borehole logging tool traverses a fluid-filled cased well with an acoustic energy transmitter. Pressure waves created in the well fluid by the transmitter generate tube waves in the well casing. A closely spaced receiver detects tube waves that have traveled along the cased wellbore and been reflected by fracture interfaces. These reflected tube waves are recorded and used to identify the top and bottom of any fracture interval in the formation behind the well casing.

12 Claims, 4 Drawing Sheets

METHOD FOR IDENTIFYING FORMATION FRACTURES SURROUNDING A WELL CASING

BACKGROUND OF THE INVENTION

The present invention relates in general to a method for identifying formation fractures surrounding a well casing and, more particularly, to a method for detecting the presence of hydraulically induced fractures behind such well casing.

It has long been known to acoustically log open wellbores to determine the velocities of compression ("P") waves and shear ("S") waves traveling through rock formations located in the wellbore region and tubes waves ("T") traveling along the wellbore interface. Logging devices have been used for this purpose which normally comprise a sound source (transmitter) and one or more receivers disposed at pre-selected distances from the sound source.

By timing the travel of compression waves, shear waves, and/or tube waves between the transmitter and each receiver, it is normally possible to determine the nature of surrounding rock formations including natural fracture identification. For descriptions of various logging techniques for collecting and analyzing compressional wave, shear wave, tube wave, and secondary wave data, please refer to U.S. Pat. Nos. 3,333,238 (Caldwell); 3,356,117 (Loren); 3,362,011 (Zemanek, Jr.); U.S. Pat. No. Re. 24,446 (Summers); U.S. Pat. Nos. 4,383,308 (Caldwell) and 4,715,019 (Medlin et al.); and to "The Correlation of Tube Wave Events With Open Fractures in Fluid-Filled Boreholes" by Huang and Hunter in Geological Survey of Canada, pages 336–376, 1981.

In each of the foregoing references, the acoustic waves are generated in the formation in response to an acoustic energy transmission from within an open wellbore. However, the teachings of such references are not applicable to the indentification of induced fractures in formations which are traversed by well casing, that is, well pipe cement bonded to the formation. It is therefore a specific objective of the present invention to provide for a method of logging a cased well to detect hydraulically induced fractures, in the formations surrounding the cased well.

SUMMARY OF THE INVENTION

In accordance with the present invention, there is provided a method of acoustic well logging for identifying formation fractures behind well casing.

More particularly, a fluid-filled well casing penetrating a subsurface formation is traversed with a well logging tool containing an acoustic energy transmitter. The transmitter is excited with a plurality of tone bursts of fixed frequency and resonates to produce acoustic energy tube waves in the cased wellbore. Direct arrivals of the tube waves traveling along the cased wellbore are detected at a closely spaced receiver. Tube waves are also detected which have traveled along the cased wellbore away from the transmitter and receiver and have been partially reflected back toward the receiver from a point along the well casing adjacent a top or bottom of a formation fracture. Both these direct tube wave arrivals and tube wave reflections are recorded. A hydraulically induced fracture tip is identified as being located at a depth point at which a common event on each of the tube wave reflections is projected to coincide with a corresponding event on the tube wave direct arrivals.

In a further aspect, a tube wave initially traveling up the cased wellbore from the transmitter and receiver and thereafter reflected back down the cased wellbore toward the receiver identifies the bottom of the fracture interval when the transducer and receiver are outside the fracture interval while a tube wave initially traveling down the cased wellbore from the transmitter and receiver and thereafter reflected back up the cased wellbore to the receiver identifies the top of the fracture interval when the transducer and receiver are outside the fracture interval.

In a still further aspect, the frequency of the tube waves, is selected to minimize tube wave reflections from well casing collars. Such frequency is preferably between 200 HZ and 2 kilohertz.

In a yet further aspect, the tube wave log of the present invention is run both before and after a hydraulic fracturing operation to determine the effectiveness of the hydraulic fracturing treatment on the formation surrounding the well casing.

DESCRIPTION OF PREFERRED EMBODIMENT

The present invention is directed to a method for generating tube waves in a cased well and measuring reflections of such tube waves as they travel along the well casing to identify fracture intervals behind the well casing.

Figure 1:
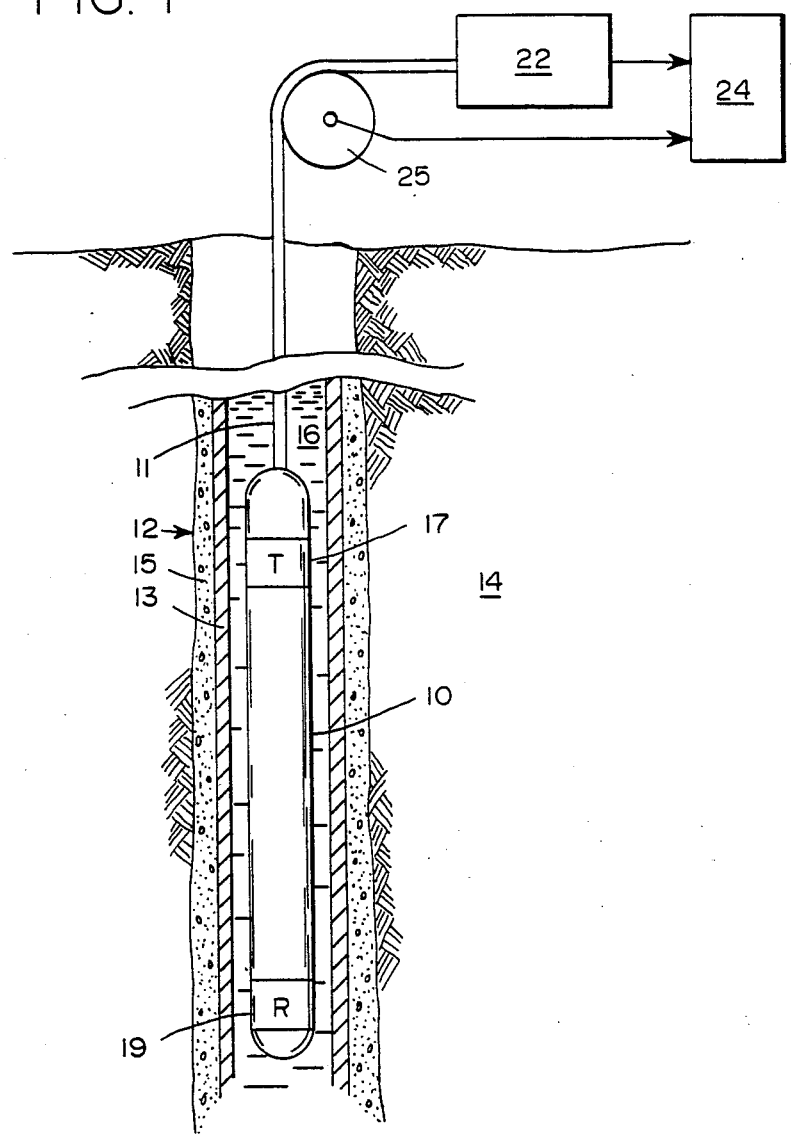
FIG. 1 illustrates an acoustic borehole logging system for use in carrying out the method of the present invention.

Referring now to FIG. 1 there is illustrated an acoustic logging system that is used in accordance with the present invention for generating and receiving acoustic tube waves in well casing. The logging system includes an elongated logging tool 10 which is suspended from a cable 11 within a cased well 12 which traverses a subsurface formation of interest 14. The cased well 12 comprising a casing 13 and a cement sheath 15 is filled with a fluid, such as a completion fluid 16. The logging tool comprises an acoustic transmitter 17 and an acoustic receiver 19. Signals from the logging tool 10 are transmitted uphole by conductors within cable 11 to any suitable utilization system at the surface. For example, the utilization system is illustrated as comprising an uphole analysis and control circuit 22 and a recorder 24 in order that the output from circuit 22 may be correlated with depth.

The logging tool 10 may be moved through the borehole at any suitable rate while it is operated to generate and receive acoustic pulses. Typically, the tool will be lowered to the bottom of the interval to be logged and then pulled upwardly during the logging measurements at a speed of at least 10 feet per minute. Somewhat greater logging speeds, e.g., 20 feet per minute, normally can be used.

To carry out the method of the present invention, the acoustic transmitter 17 comprises at least one characteristic resonance frequency between a few hundred hertz and several kilohertz, such as between about 200 hertz and 2 kilohertz for example. Such a resonator type transmitter may preferably take the form of a double bender-type transducer, a flexure disc-type transducer or a Helmholtz type transducer. A suitable double bender-type transducer is described in U.S. Pat. No. 4,718,046 to Medlin. A suitable flexure disc-type transducer is described in U.S. Pat. Nos. 3,363,118 to Sims and 4,742,495 to Medlin and Slover. A suitable Hlemholtz type transducer is described in U.S. Pat. No. 4,432,077 to Alhilali and Zemanek and U.S. Pat. No. 4,674,067 to Zemanek. The teachings of these patents are incorporated herein by reference.

Receiver 19 may be any of several type hydrophones or ceramic devices conventionally used in acoustic borehole logging. Such receiver should preferably have a flat response over the acoustic frequency band and is closely spaced from the transmitter 17, such as no more than about 3 to 5 feet away.

Transmitter 17 is utilized to generate acoustic energy imparting a pressure wave in the well fill-fluid. Such transmitter is excited to resonance either by a transient, high-voltage pulse or by a fixed-frequency, sine wave tone burst of about 3 cycles applied across its active elements. In logging operations, the transmitter is excited repetitively at a rate which is typically in the range 1–10 per second.

After each excitation, the pressure waves of the resonant acoustic energy cause outward and inward deflections of the well casing. These deflections traverse both upwardly and downwardly from the transmitter along the cased wellbore as tube waves. Direct arrivals of these tube waves are received at the receiver 19 within about a millisecond after excitation of the transmitter 17.

As the tube waves move upwardly and downwardly in the cased wellbore from the transmitter and receiver they may be subject to partial reflection back along the cased wellbore to the receiver by the presence of tube wave impedance changes created by the effects of a hydraulically induced fracture behind the perforated well casing. The tube wave reflections start and end at the top and bottom of the fractured interval and may appear within this interval if there are local changes in fracture volume. These tube wave reflections are recorded and displayed in correlation with depth so as to identify the height of each fractured interval. With a tube wave frequency below about 2 kilohertz the principal tube wave reflections are from the fractured interval and the wellbore bottom. Above about 2 kilohertz the casing collars begin to act as prominent reflectors in intervals of poor cement bond. Consequently the transmitter 17 is preferably energized to resonate below about 2 kilokertz.

In addition to using a tube wave log of recorded reflections traveling through the well casing to locate hydraulically induced fractures and determine fracture heights or intervals, the present invention may be utilized to determine the effectiveness of a hydraulic fracturing operation through perforations in the well casing. Prior to hydraulic fracturing, the tube wave log is run in a cased well traversing the formation to be fractured. The formation is then fractured hydraulically at selected formation intervals through perforations in the well casing. After the hydraulic fracture treatment is complete, the tube wave log is again run in the cased well. The difference in these two tube wave logs indicates the effectiveness of the hydraulic fracture treatment. Typical hydraulic fracturing treatments are described in U.S. Pat. Nos. 4,687,061 and 4,714,115 to D.C. Uhri, the teachings of which are incorporated herein by reference.

Figure 2:
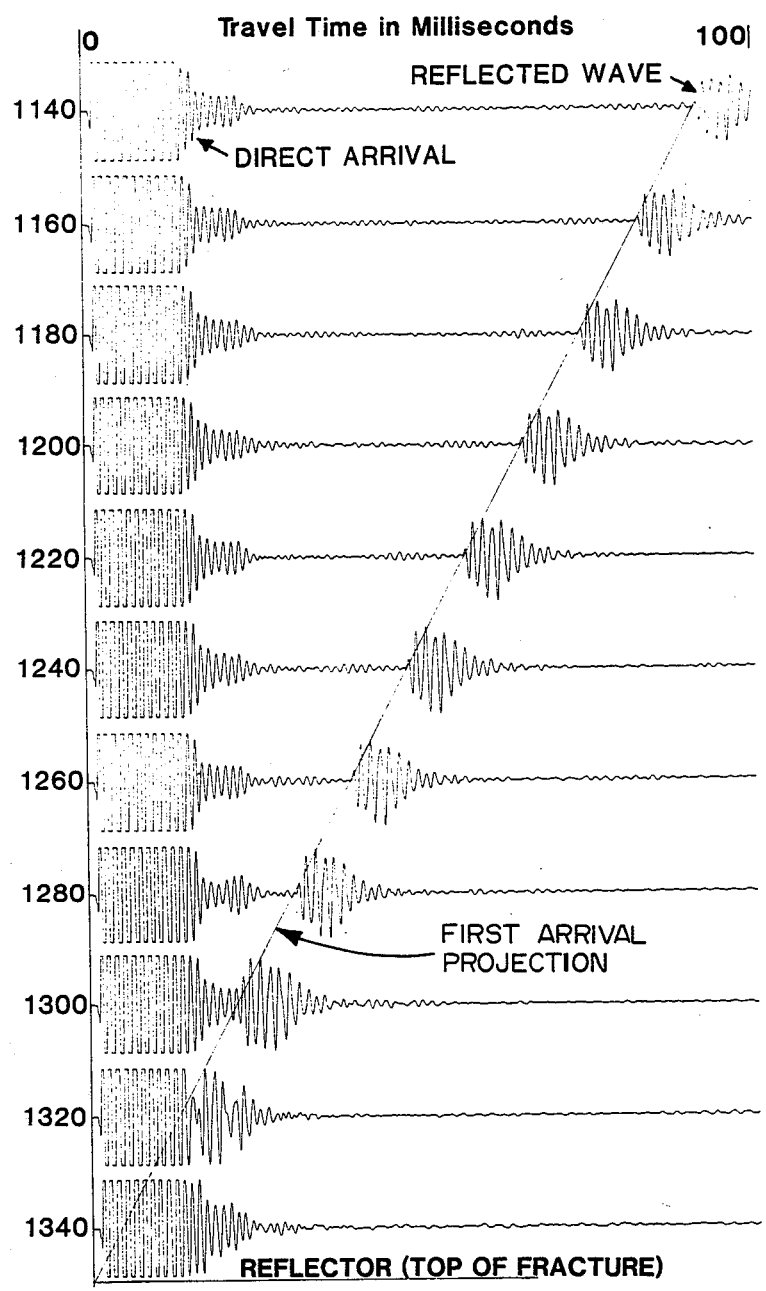
FIGS. 2 and 3 illustrate tube wave reflection logs recorded by the borehole logging system of FIG. 1.

A typical tube wave log run in a cased well following a hydraulic fracturing operation is illustrated in FIG. 2 for identifying the top of a formation fracture. In this example, the receiver is shown as being monitored for 100 milliseconds after each transmitter excitation. At each excitation, the tube wave energy moves in both directions along the well casing. The downgoing tube wave produces a strong direct arrival wavelet as it passes the receiver closely spaced below the transmitter. Further along, it reaches the top of a fracture located below the logging tool and is partially reflected. The reflected tube wave energy travels back up the well casing and is detected as a weaker wavelet arriving some time later, such as about 90 milliseconds later, when the transmitter and receiver are located at about 1140 feet. In similar manner, but not shown in FIG. 2, upgoing tube waves would be reflected downward from the bottom of a fracture located above the logging tool.

As can be seen in FIG. 2, the reflected tube waves arrive at the receiver at progressively later times as the logging tool moves up the wellbore away from the fracture top. By projecting an event in each of the tube wave reflection wavelets, such as the first arrival, to the corresponding event in the direct wave, the fracture top is identified. Such a projection of first arrivals is shown in FIG. 2. As noted in FIG. 2 such projection intersects the corresponding event on the direct arrival wavelets at a depth slightly below 1340 feet. It is this depth point that is identified in FIG. 2 as the fracture top.

Figure 3:
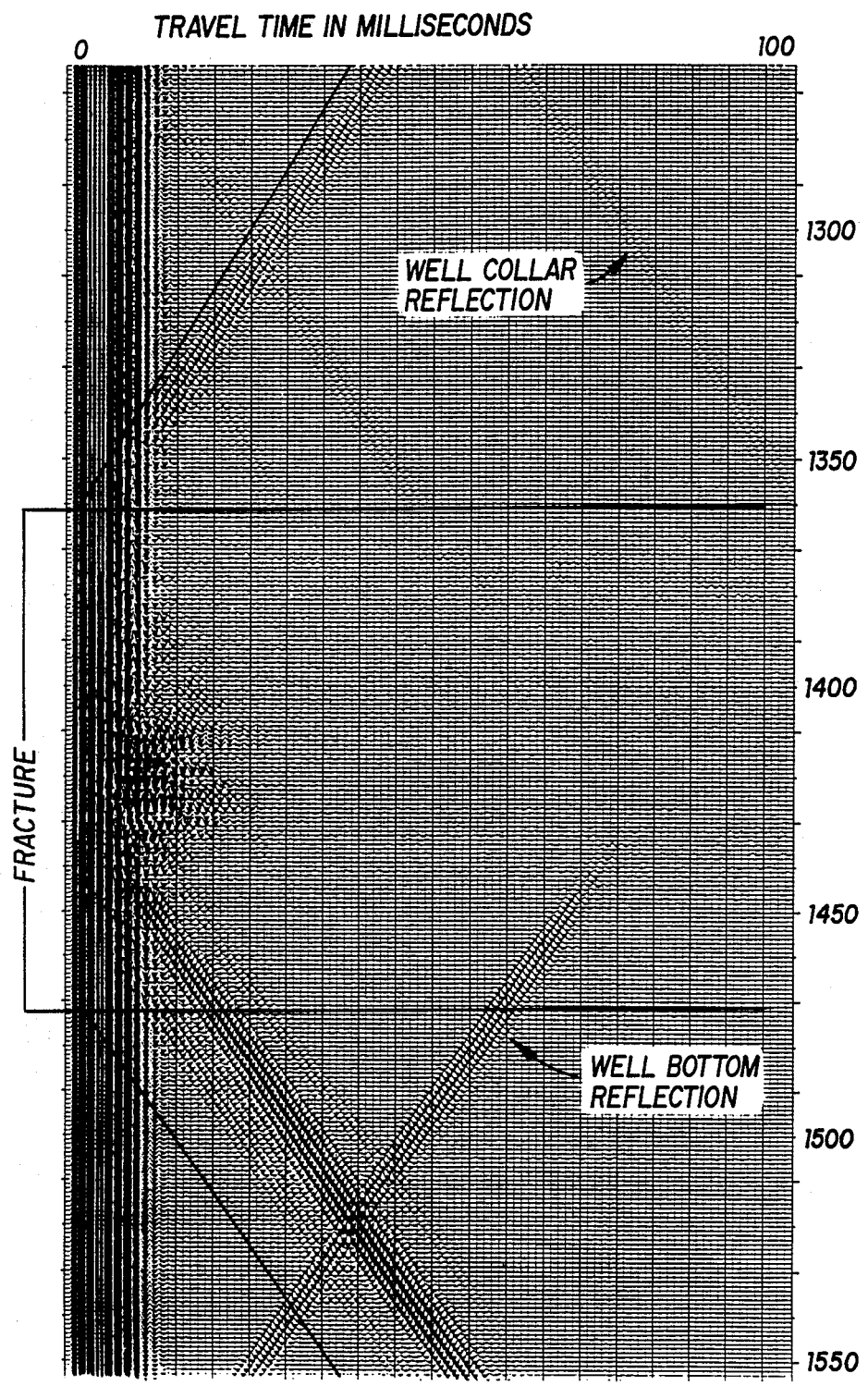

A complete log of a formation interval will identify both the top and bottom of each fracture interval. Such a log is shown in FIG. 3. The fracture top is identified from the intersection of the projected select tube wave reflection event and the corresponding direct arrival event at about 1360 feet. The fracture bottom is identified from the intersection of the projected select tube wave reflection event and the corresponding direct arrival event at about 1470 feet.

The tube wave reflection event may be selected from any of several common features on each tube wave reflection, such as the first arrival as clearly seen in FIG. 2, a maximum amplitude or an amplitude envelope peak for examples.

Figure 4:
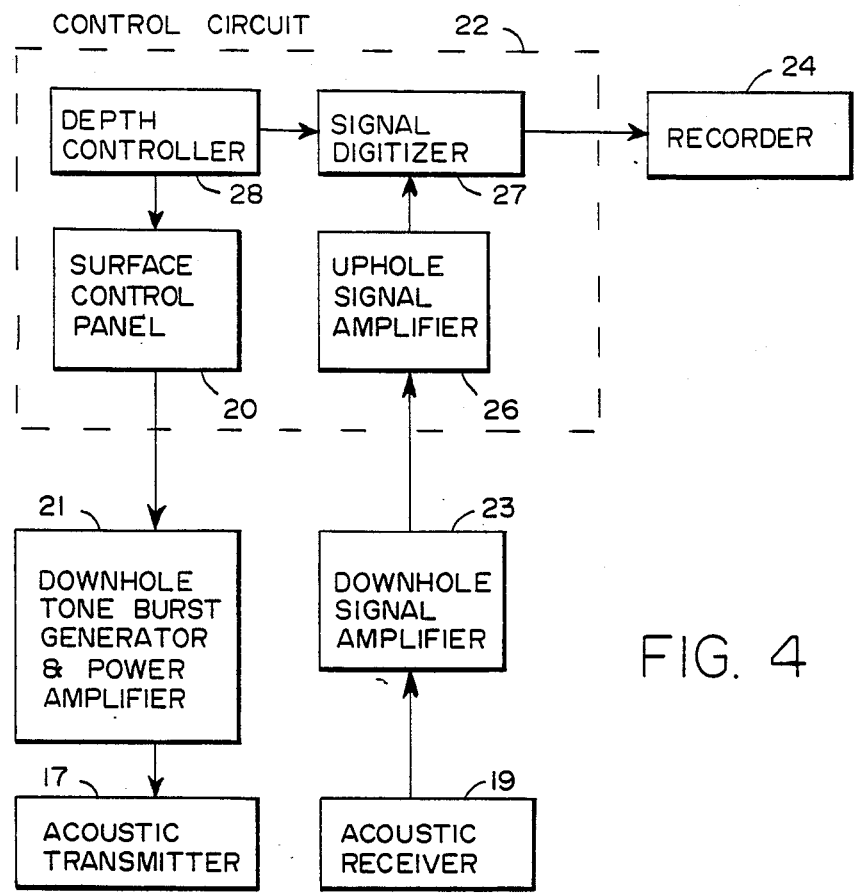
FIG. 4 is a schematic block diagram of electronic circuitry utilized in the operation of the borehole logging system of FIG. 1.

In recording the tube wave reflection log, the circuitry of FIG. 4 may be employed. A downhole tone burst generator and power amplifier 21 in the logging tool 10 provides preferably a gated sine wave excitation to the transmitter 17. Transmitter 17 responds with a characteristic resonant vibration. A commercial version of the generator and power amplifier 21 is the Model 7060 Generator supplied by Exact Electronics, Hillsboro, Oregon with a Model MC 2500 Power Amplifier supplied by McIntosh Laboratory, Binghamton, N.Y. Amplitudes are in the range of 100–150 volts. This voltage is sufficient for generating acoustic source levels from the transmitter which will provide detectable acoustic signals in conventional borehole logging tools. The output of receiver 19 is amplified by a downhole signal amplifier 23 and carried over cable 11 to an uphole signal amplifier 26. A continuous measurement of the receiver 19 output amplitude is provided by the amplifier 26. Such detector provides a way to sense and record amplitudes much more rapidly than with a conventional signal analyzer. This allows successive traces to be recorded at one-foot intervals while moving the logging tool along a borehole at normal logging speeds.

Foot-by-foot recordings of traces such as shown in FIG. 3 constitute the tube wave reflection log. Tone burst excitation of the acoustic transmitter at one-foot intervals is triggered by the depth encoder 28 of FIG. 4. This encoder produces a triggering pulse at each one-foot interval of depth as the tool moves up the borehole. This pulse is also used to condition the signal digitizer 27 to start digitizing the output of amplifier 26. This cycle is repeated when the depth encoder produces the next triggering pulse for the next one-foot depth point. Since the transmitter-to-receiver spacing is small the delay due to travel of tube waves from the transmitter to the receiver can be neglected. To properly display the large range of amplitude variations in each trace by this method of recording requires an extended vertical scale. Very long records are needed to cover borehole intervals of practical interest.

Having now described a preferred embodiment of the present invention it will be understood that numerous modifications or alterations may be made without departing from the spirit and scope of the invention as set forth in the appended claims.

What is claimed is:

1. A method of acoustic well logging for identifying formation fracture interfaces behind well casing, comprising the steps of:
   (a) traversing a fluid-filled cased well penetrating a subsurface formation with a well logging tool containing an acoustic energy transmitter,
   (b) exciting said transmitter with a plurality of tone bursts of fixed frequency to drive said transmitter to resonate and produce acoustic energy tube waves in said cased wellbore,
   (c) receiving a first of said tube waves which have traveled through said cased wellbore from said transmitter toward a receiver closely-spaced to said transmitter,
   (d) receiving a second of said tube waves at said receiver which have traveled along said cased wellbore away from said transmitter and receiver and have been partially reflected back toward said receiver from a point along said cased wellbore adjacent a hydraulically induced fracture,
   (e) recording the arrivals of said first and second tube waves at said receiver and
   (f) identifying said hydraulically induced fracture behind the cased wellbore as being located at a depth point at which a common event on the recording of said second tube waves is projected to coincide with a corresponding event on the recording of said first tube waves.

2. The method of claim 1 wherein the frequency of said tone bursts is selected to minimize tube wave reflections from well casing collars.

3. The method of claim 2 wherein said tone burst is of a frequency no greater than about 2 kilohertz.

4. The method of claim 1 wherein said recording of said first and second tube waves is in the form of a variable density log.

5. The method of claim 1 wherein said common event in said second tube waves is one of the peak amplitudes of said second tube waves.

6. The method of claim 1 wherein said common event in said second tube waves is a first arrival.

7. A method for determining the effectiveness of a hydraulic fracturing operation in a subsurface formation behind well casing comprising the steps of:
   (a) traversing a fluid-filled cased wellbore penetrating a subsurface formation with a well logging tool containing an acoustic energy transmitter,
   (b) exciting said transmitter with a plurality of tone bursts of fixed frequency to drive said transmitter to resonate and produce acoustic energy tube waves in said cased wellbore,
   (c) receiving a first of said tube waves which have traveled through said cased wellbore from said transmitter toward a closely-spaced receiver to said transmitter,
   (d) receiving a second of said tube waves at said receiver which have traveled along said cased wellbore away from said receiver and have been partially reflected back toward said receiver from points along said cased wellbore,
   (e) recording the arrivals of said first and second tube waves at said receiver,
   (f) hydraulically fracturing said subsurface formation through perforations in said cased wellbore,
   (g) repeating steps (a) through (e) following the hydraulic fracturing of said subsurface formation,
   (h) comparing the recording of said first and second tube waves before and after the hydraulic fracturing of said subsurface formation to identify those of said second tube waves occurring only after said hydraulic fracturing,
   (i) projecting a second tube wave event common to each of the second tube waves occurring after hydraulic fracturing from the point of origin of said common event on the recording of said second tube waves to a corresponding event on the recording of said first tube waves, and
   (j) identifying a formation fracture tip behind the well casing as being located at a depth point at which said corresponding event occurs on the recording of said first tube waves.

8. The method of claim 7 further comprising the step of identifying the bottom of a fracture interval from said second tube waves which have initially traveled up the cased wellbore from the transmitter and receiver and been reflected back down the cased wellbore toward the receiver when the transmitter and receiver are located outside the fracture interval.

9. The method of claim 7 further comprising the step of identifying the top of a fracture interval from said second tube waves which have initially traveled down the cased wellbore from the transmitter and receiver and been reflected back up the cased wellbore toward the receiver when the transmitter and receiver are located outside the fracture interval.

10. The method of claim 7 wherein said tone bursts are in the order of 3 cycles.

11. The method of claim 7 wherein the frequency of said tone bursts is selected to minimize tube wave reflections from well casing collars.

12. The method of claim 11 wherein the frequency of said tone bursts is in the range of about 200 hertz to 2 kilohertz.

* * * * *